US010053915B2

(12) United States Patent
Milligan

(10) Patent No.: US 10,053,915 B2
(45) Date of Patent: Aug. 21, 2018

(54) COMPENSATOR CLIP RING RETAINER CAP FOR A ROLLER CONE DRILL BIT

(71) Applicant: Halliburton Energy Services, Inc., Houston, TX (US)

(72) Inventor: Robin Brian Milligan, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 163 days.

(21) Appl. No.: 15/029,262

(22) PCT Filed: Nov. 15, 2013

(86) PCT No.: PCT/US2013/070334
§ 371 (c)(1),
(2) Date: Apr. 14, 2016

(87) PCT Pub. No.: WO2015/073027
PCT Pub. Date: May 21, 2015

(65) Prior Publication Data
US 2016/0258220 A1    Sep. 8, 2016

(51) Int. Cl.
*E21B 10/24* (2006.01)
*E21B 10/25* (2006.01)
*F16C 33/66* (2006.01)

(52) U.S. Cl.
CPC .............. *E21B 10/24* (2013.01); *E21B 10/25* (2013.01); *F16C 33/66* (2013.01); *F16C 2352/00* (2013.01)

(58) Field of Classification Search
CPC ...... F16C 33/66; F16C 2352/00; E21B 10/24; E21B 10/25
See application file for complete search history.

(56) References Cited

U.S. PATENT DOCUMENTS

| 4,276,946 A | 7/1981 | Millsapps, Jr. |
| 4,865,136 A | 9/1989 | White |
| 4,942,930 A | 7/1990 | Millsapps, Jr. |
| 5,072,795 A | 12/1991 | Delgado et al. |
| 7,665,547 B2 | 2/2010 | Yong et al. |
| 8,347,986 B2 | 1/2013 | Anderele |
| 2011/0017514 A1 | 1/2011 | Anderele |

OTHER PUBLICATIONS

International Search Report and Written Opinion, Application No. PCT/US2013/070334; 15 pages, dated Aug. 20, 2014.

*Primary Examiner* — D. Andrews
*Assistant Examiner* — Yanick A Akaragwe
(74) *Attorney, Agent, or Firm* — Baker Botts L.L.P.

(57) ABSTRACT

A roller cone drill bit is disclosed. The drill bit includes a bit body with a support arm extending therefrom, and a cone assembly mounted on a journal extending from the support arm. The drill bit further includes a lubricant chamber in the support arm, and a compensator assembly in the lubricant chamber. The compensator assembly includes a lubricant container with a securing end. The compensator assembly further includes a clip ring coupled to the lubricant container and configured to retain the lubricant container in the lubricant chamber. Additionally, the compensator assembly includes a ring cap with a securing hole configured to couple to the securing end of the lubricant container. The ring cap includes a shoulder configured to retain the clip ring.

20 Claims, 4 Drawing Sheets

ID RETAINER CAP
COMPENSATOR CLIP RING RETAINER CAP FOR A ROLLER CONE DRILL BIT

RELATED APPLICATION

This application is a U.S. National Stage Application of International Application No. PCT/US2013/070334 filed Nov. 15, 2013, which designates the United States, and which is incorporated herein by reference in its entirety.

TECHNICAL FIELD

The present disclosure is related to roller cone drill bits and more particularly to a compensator clip ring retainer cap for a roller cone drill bit.

BACKGROUND

Roller cone drill bits are used to form wellbores in subterranean formations. Roller cone drill bits generally include at least one support arm and often three support arms. A respective cone assembly may be rotatably mounted on interior portions of each support arm. Each cone assembly may include a base with a cavity formed therein. Each cone cavity may be sized to receive exterior portions of a journal or spindle to allow rotation of the cone assembly relative to the journal or spindle while drilling a wellbore. A wide variety of bearings, bearing assemblies, bearing surfaces, seals and/or other supporting structures may be disposed between interior portions of each cone assembly and exterior portions of the journal or spindle.

Roller cone drill bits may further include lubricant systems to supply lubricant to journals, bearings, bearing assemblies, bearing surfaces, seals and/or other supporting structures associated with rotation of each cone assembly mounted on a respective support arm. A variety of lubricants may be used with roller cone drill bits to accommodate rotation of each cone assembly relative to the respective spindle. A wide variety of seals and seal assemblies may be used to prevent leaking of lubricants, prevent contamination from downhole well fluids entering the interior of each cone assembly, and/or maintain lubricant system pressure.

DETAILED DESCRIPTION

Figure 1:
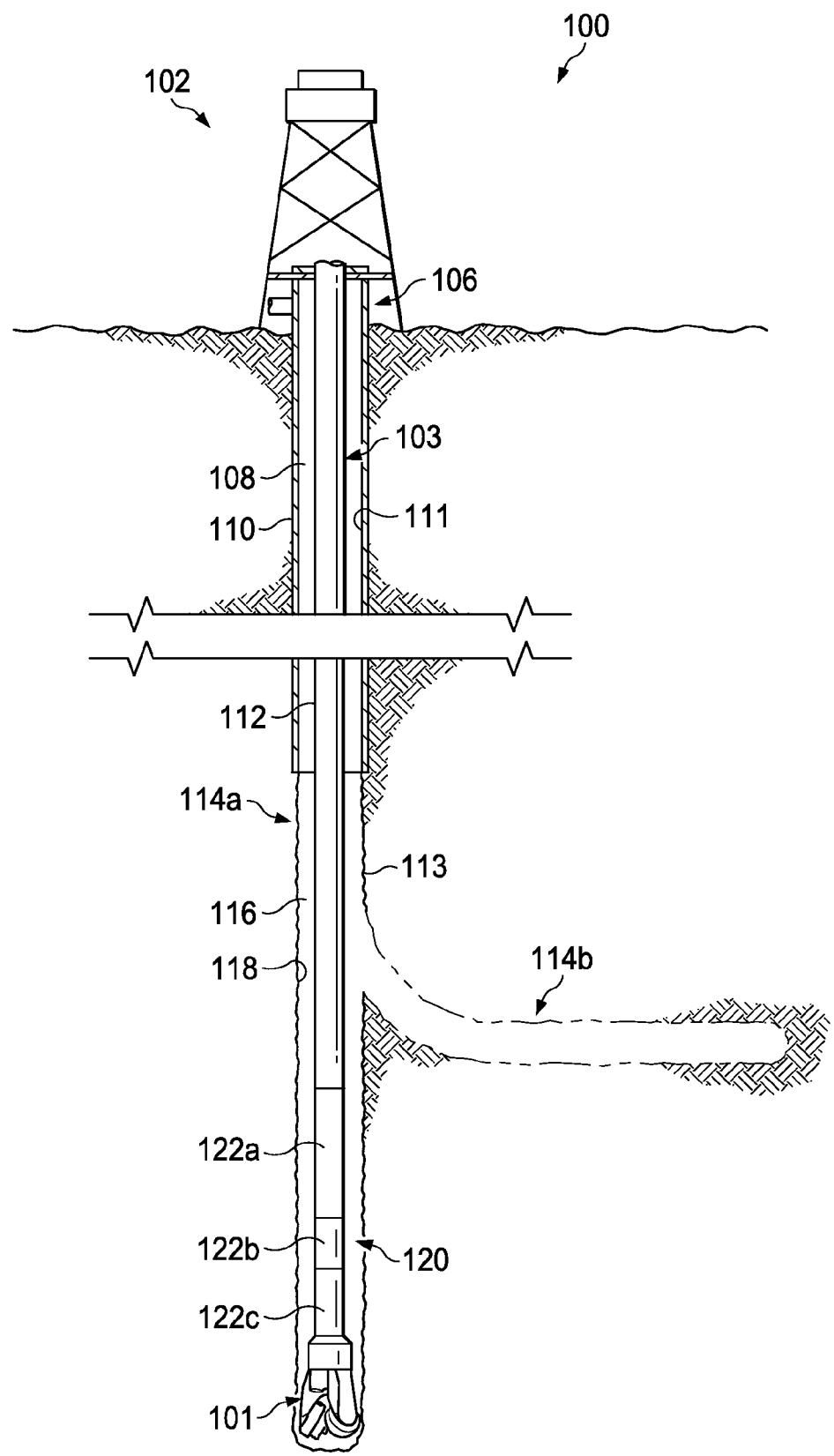
FIG. 1 illustrates a schematic drawing of an example drilling system configured to drill into one or more geological formations, in accordance with some embodiments of the present disclosure.

Various features of the present disclosure may be described with respect to roller cone drill bits, support arms, cone assemblies, pressure relief mechanisms, lubricant systems and/or associated components. Specific example embodiments of the present disclosure are further described with reference to FIGS. 1 through 4, where like reference numerals are used to indicate like and corresponding parts.

FIG. 1 illustrates a schematic drawing of example drilling system 100 configured to drill into one or more geological formations, in accordance with some embodiments of the present disclosure. Drilling system 100 may include a well site 106. Various types of drilling equipment such as a rotary table, mud pumps and mud tanks (not expressly shown) may be located at well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles, and/or drilling barges (not expressly shown).

Drilling system 100 may include drill string 103 associated with roller cone drill bit ("drill bit") 101 that may be used to form a wide variety of wellbores or bore holes such as generally vertical wellbore 114a or generally horizontal wellbore 114b. Various directional drilling techniques and associated components of bottom hole assembly (BHA) 120 of drill string 103 may be used to form horizontal wellbore 114b. For example, lateral forces may be applied to drill bit 101 proximate kickoff location 113 to form horizontal wellbore 114b extending from generally vertical wellbore 114a.

BHA 120 may be formed from a wide variety of components configured to form wellbore 114. For example, components 122a, 122b and 122c of BHA 120 may include, but are not limited to, drill bits (e.g., drill bit 101) drill collars, rotary steering tools, directional drilling tools, downhole drilling motors, drilling parameter sensors for weight, torque, bend and bend direction measurements of the drill string and other vibration and rotational related sensors, hole enlargers such as reamers, under reamers or hole openers, stabilizers, measurement while drilling (MWD) components containing wellbore survey equipment, logging while drilling (LWD) sensors for measuring formation parameters, short-hop and long haul telemetry systems used for communication, and/or any other suitable downhole equipment. The number of components such as drill collars and different types of components 122 included in BHA 120 may depend upon anticipated downhole drilling conditions and the type of wellbore that will be formed by drill string 103 and drill bit 101.

Wellbore 114 may be defined in part by casing string 110 that may extend from well site 106 to a selected downhole location. Portions of wellbore 114, as shown in FIG. 1, that do not include casing string 110 may be described as "open hole." In addition, liner sections (not expressly shown) may be present and may connect with an adjacent casing or liner section. Liner sections (not expressly shown) may not extend to the well site 106. Liner sections may be positioned proximate the bottom, or downhole, from the previous liner or casing. Liner section may extend to the end of wellbore 114. Various types of drilling fluid may be pumped from well site 106 through drill string 103, which may contain an internal passageway for the drilling fluid to flow, to drill bit 101. Such drilling fluids may be directed to flow from drill string 103 to respective nozzles (not expressly shown) included in drill bit 100. The drilling fluid may be circulated back to well site 106 through an annulus 108 defined in part by outside diameter 112 of drill string 103 and inside diameter 118 of wellbore 114. Inside diameter 118 may be referred to as the "sidewall" or "bore wall" of wellbore 114. Annulus 108 may also be defined by outside diameter 112 of drill string 103 and inside diameter 111 of casing string 110. Open hole annulus 116 may be defined as sidewall 118 and outside diameter 112.

Drill bit 101 may be any of various types of fixed cutter drill bits, including PDC bits, drag bits, matrix drill bits, and/or steel body drill bits operable to form wellbore 114 extending through one or more downhole formations. Drill bit 101 may be designed and formed in accordance with teachings of the present disclosure and may have many different designs, configurations, and/or dimensions according to the particular application of drill bit 101. Roller cone drill bits such as drill bit 101 may form wellbores by crushing or penetrating a formation and scraping or shearing formation materials from the bottom of the wellbore using cutting elements which often produce a high concentration of fine, abrasive particles.

During operation, drilling system 100 may include drilling fluid that may flow in to and out of wellbore 114 around drilling string 103, drill bit 101, and other downhole components. The drilling fluid may include contaminants from, for example, the removal of material as drill bit 101 drills wellbore 114. Seals may be present in drill bit 101 to exclude drilling fluid and associated contaminants from the internal mechanisms of drill bit 101. Such seals may degrade over time due to pressure, temperature, and/or other environmental factors experienced by drill bit 101. A mechanical pressure compensator (MPC) assembly, also referred to as a "compensator assembly," may be employed to maintain an approximately consistent and/or equivalent pressure on seals designed to exclude drilling fluid and associated contaminants. As the downhole pressure changes, components that seat the compensator assembly into drill bit 101, e.g., a clip ring, may experience undesired movement and begin to degrade by, for example, fretting. Movement of the seating mechanism may result in the compensator assembly becoming unseated and/or loose in drill bit 101 and may cause damage to downhole components of drilling system 100. Utilization of a clip ring cap to secure the clip ring with respect to the lubricant container, e.g., by using a threaded clip ring cap and threaded lubricant container, may substantially eliminate movement of the clip ring and thus, decrease the potential for unseating the compensator assembly and any resulting damage.

Figure 2:
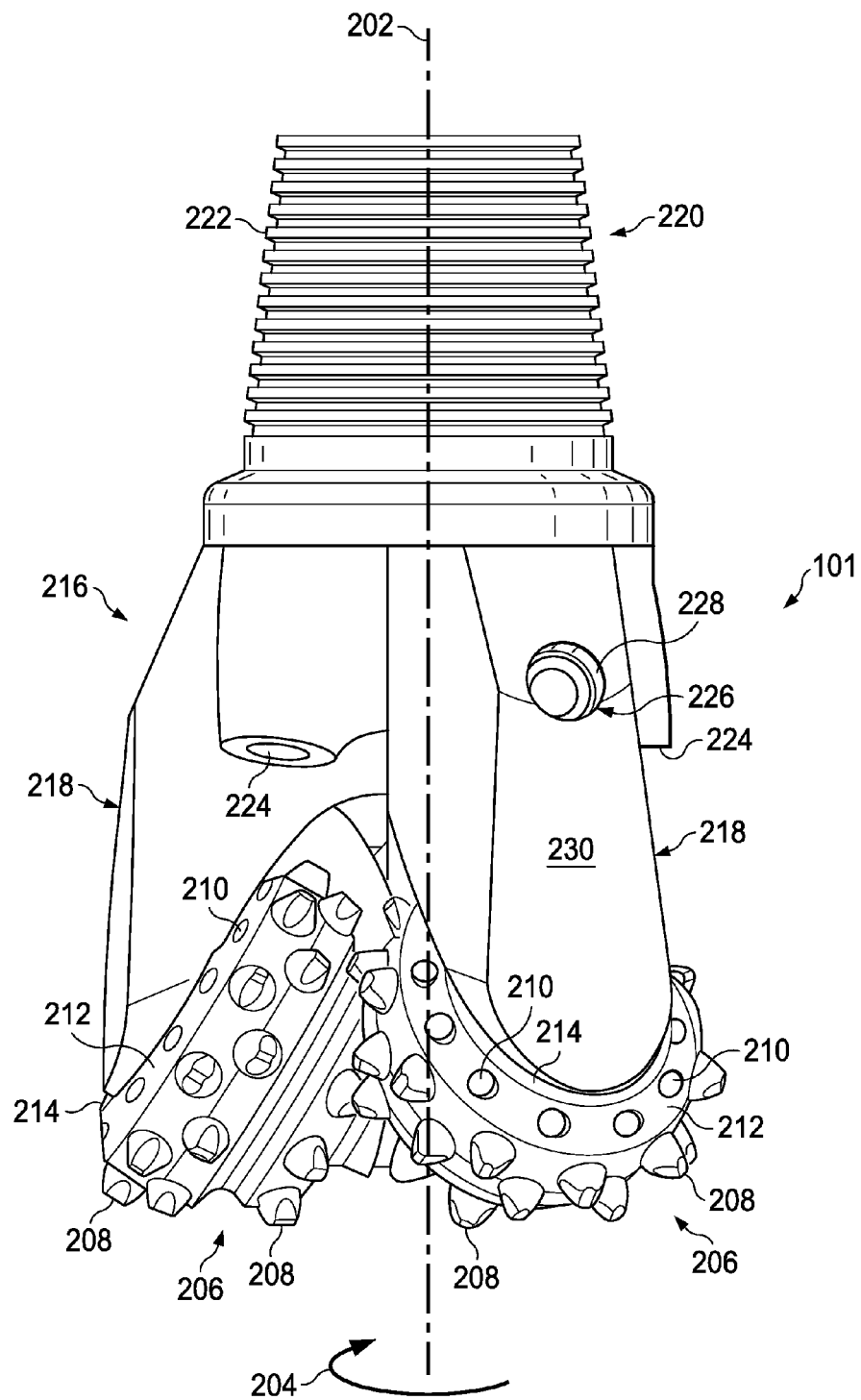
FIG. 2 illustrates a schematic drawing showing an isometric view of one example of a roller cone drill bit, in accordance with some embodiments of the present disclosure.

FIG. 2 illustrates a schematic drawing showing an isometric view of one example of roller cone drill bit 101, in accordance with some embodiments of the present disclosure. Drill bit 101 may be referred to as a "roller cone drill bit," "rotary cone drill bit," "rotary rock bit," or "rock bit. Roller cone drill bits may have at least one support arm with a respective cone assembly rotatably disposed thereon.

A drill string (not expressly shown) may be attached to and rotate drill bit 101 relative to bit rotational axis 202. Drill bit 101 may rotate as indicated by arrow 204. Cutting action associated with forming a wellbore in a downhole formation may occur as cone assemblies, indicated generally at 206, engage and roll around the bottom or downhole end of a borehole or wellbore (not shown) in response to rotation of drill bit 101.

Figure 3:
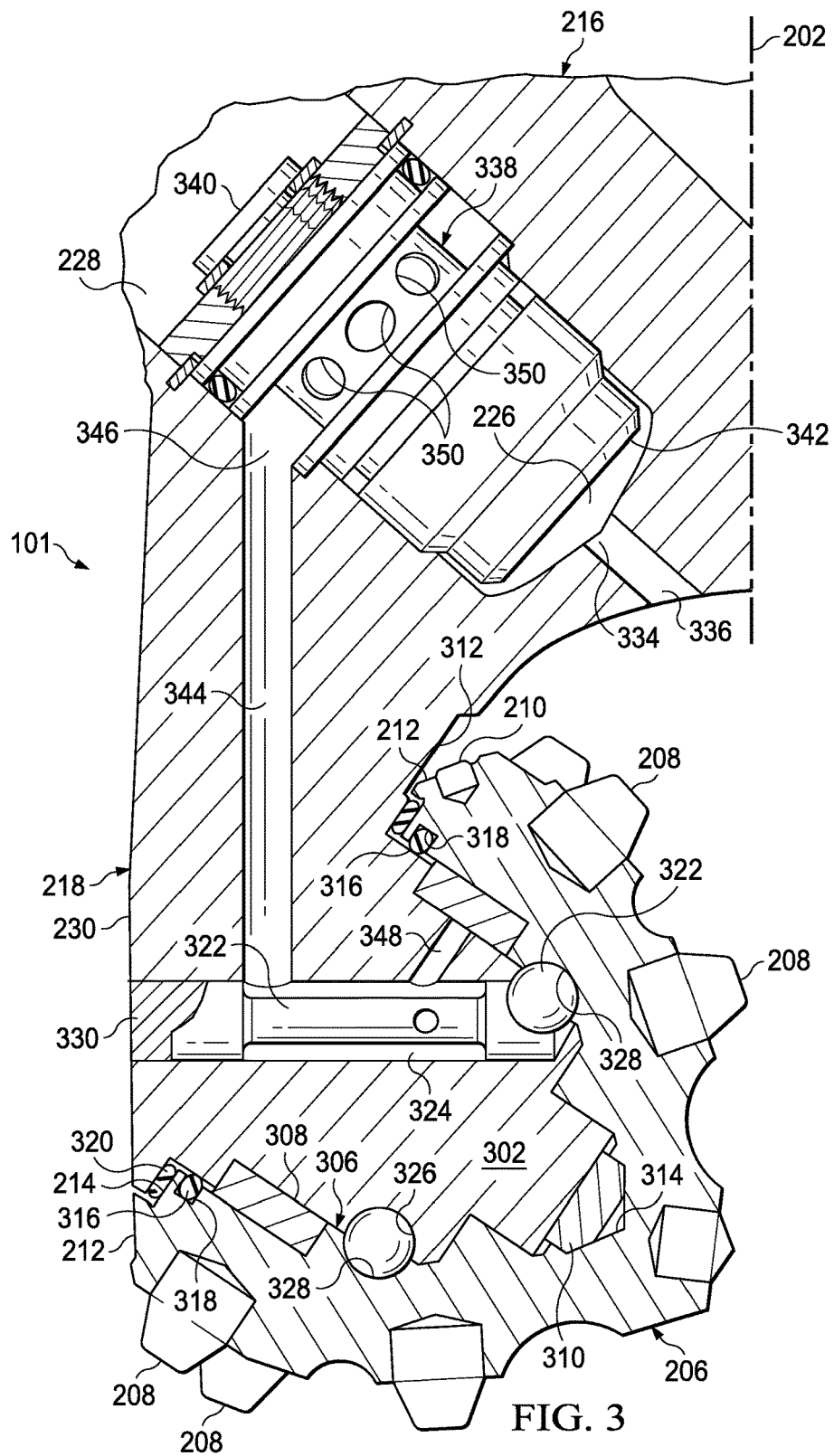
FIG. 3 illustrates a schematic drawing in section with portions broken away showing various components of a roller cone drill bit and lubrication system, in accordance with some embodiments of the present disclosure.

Each cone assembly 206 may be attached to and rotate relative to exterior portions of spindle or journal 302, as shown in FIG. 3. Cone assembly 206 may be referred to as a "roller cone," "rotary cone cutter," "roller cone cutter," "rotary cutter assembly" and "cutter cone assembly." Each of cone assemblies 206 may include a plurality of cutting elements or inserts 208 which penetrate and scrape against adjacent portions of a downhole formation in response to rotation of drill bit 101. Cone assemblies 206 may also include a plurality of compacts 210 disposed on gage surface 212 of each cone assembly 206. Cutting elements 208 may include various types of compacts, inserts, milled teeth and welded compacts satisfactory for use with roller cone drill bits. Cone assembly 206 may also include generally circular base portion 214.

In some embodiments, drill bit 101 may include bit body 216 having three support arms 218 extending therefrom. Although, only two support arms 218 may be seen in FIG. 2, the teachings of the present disclosure may be used in drill bits with various numbers of support arms 218. Uphole portion or pin end 220 of drill bit 101 may include generally tapered, external threads 222. Threads 222 may be used to releasably engage drill bit 101 with the downhole end of a drill string or BHA, as shown with respect to FIG. 1.

Formation materials and other downhole debris created during impact between cutting elements 208 and adjacent portions of a downhole formation may be carried from the bottom or end of a wellbore by drilling fluid flowing from nozzles 224. Such drilling fluid may be supplied to drill bit 101 by a drill string, such as drill string 103 shown in FIG. 1, attached to threads 222. Drilling fluid with formation cuttings and other downhole debris may flow upwardly around exterior portions of drill bit 101 and through an annulus, such as annulus 108, formed between exterior portions of drill bit 101 and exterior portions of drill string 103 and the sidewall of the wellbore to a well site, such as well site 106.

Each support arm 218 may include a lubricant system defined in part by lubricant chamber 226 and associated components. Lubricant chamber 226 may be referred to as "lubricant system chamber," "lubricant reservoir," or "lubricant cavity." Lubricant may refer to any fluid, grease, composite grease, or mixture of fluids and solids satisfactory for lubricating journal bearings, thrust bearings, bearing surfaces, bearing assemblies and/or other supporting structures associated with rotatably mounting one or more cone assemblies on a roller cone drill bit. Lubricant chamber 226 may include external end or opening 228 in communication with downhole well fluid pressure adjacent to exterior surface 230 of support arm 218. A pressure compensator assembly may be installed in lubricant chamber 226 in some embodiments of the present disclosure, as described in detail in FIG. 3.

FIG. 3 illustrates a schematic drawing in section with portions broken away showing various components of roller cone drill bit 101 and a lubrication system, in accordance with some embodiments of the present disclosure. Each cone assembly 206 may be rotatably mounted on journal 302 in a substantially similar manner. Accordingly, only one support arm 218, journal 302 and cone assembly 206 will be described in detail. Cone assembly 206 may include generally circular base portion 214 with cavity 306 extending inwardly therefrom. Cavity 306 (sometimes referred to as a "cone cavity") may have a generally cylindrical configuration sized to receive exterior portions of journal 302 therein. Gage surface 212 may extend radially outward and be tapered relative to base portion 214.

Each cone assembly 206 may be attached to and rotate relative to exterior portions of journal 302. A wide variety of supporting structures and/or bearing surfaces may be used to rotatably mount each cone assembly 206 on journal 302. For example, bearings 308 and 310 may be utilized to rotatably mount cone assembly 206 on journal 302. For some applications, bearing 308 may be described as a journal bearing. Bearing 310 may sometimes be described as a thrust bearing. For some applications, bearing surfaces associated with rotatably mounting cone assembly 206 on journal 302 may be formed as integral components (not expressly shown) disposed on exterior portions of journal 302 and interior portions of cavity 306 formed within cone assembly 206.

Each support arm 218 may include exterior surface 230 and interior surface 312, which may be exposed to downhole well fluids while forming a wellbore. Each support arm 218 may include journal 302 formed as an integral component thereof. Cone assembly 206 may be rotatably mounted on each journal 302. Each journal 302 may be angled downwardly and inwardly with respect to bit rotational axis 202 of support arm 218 so that attached cone assembly 206 may engage the bottom or end of a wellbore (not expressly shown) during rotation of drill bit 101. For some applications, journal 302 may also be tilted at an angle of zero to three or four degrees in the direction of rotation of drill bit 101 shown by arrow 204 with reference to FIG. 2.

Bearing 308 may be disposed between exterior portions of journal 302 and interior portions of cavity 306. Thrust bearing 310 may be disposed between the end of journal 302 opposite from support arm 218 and interior end 314 of cavity 306 formed in cone assembly 206 opposite from base portion 214. A wide variety of bearings, bearing surfaces and other types of supporting structures may also be disposed between exterior portions of journal 302 and interior portions of cavity 306. The present disclosure is not limited to bearing 308 and/or bearing 310.

Seal 316 may be disposed within retaining groove 318 within cavity 306 proximate base portion 214 to establish a fluid barrier between adjacent portions of cavity 306 and adjacent portions of journal 302. One or more seals or a combination of seals and backup rings may be positioned within one or more retaining grooves or otherwise disposed between cavity 306 and journal 302. For example, wiper ring or backup seal 320 may be disposed between circular base portion 214 and support arm 218. Seal 316 may be located in cavity 306 proximate an opening in base portion 314 of cone assembly 206. Seal 316 may be an elastomeric seal and may form a fluid seal or fluid barrier between adjacent interior portions of cavity 306 and adjacent exterior portions of journal 206. Seal 316 may be operable to prevent downhole well fluids, formation cuttings and/or downhole debris from entering cavity 306 and damaging bearing surfaces and supporting structures. Backup seal 320 may sometimes be located outwardly from seal 316. Backup seal 320 may provide a barrier to block contact between downhole well fluids and seal 316. As discussed below, compensator assembly 338 may be utilized to maintain a specified pressure differential across seal 316 to prevent downhole drilling fluids and debris from entering cavity 306.

Cone assembly 206 may be retained on journal 302 by a plurality of ball bearings 322 inserted through ball passage 324 formed in support arm 218 extending from exterior surface 230 through portions of journal 302. Ball bearings 322 may be disposed in an annular array (not expressly shown) within ball race 326 formed in exterior portion of journal 302 and ball race 328 formed in adjacent interior portions of cavity 306 of cone assembly 206. Once inserted, ball bearings 322 may prevent disengagement of cone assembly 206 from journal 302. Ball passage 324 may be plugged or blocked by welding ball plug 330 into ball passage 324. Ball plug 330 may include necked down or reduced diameter portion 332 which may be sized to accommodate lubricant flow to bearing 308, bearing 310, seal 316 and/or any other suitable components.

As described with reference to FIG. 2, each support arm 218 may include a lubricant system defined in part by lubricant chamber 226 and associated components. Lubricant chamber 226 may include external end 228 in communication with downhole well fluid pressure adjacent to exterior surface 230 of support arm 218. Each lubricant chamber 226 may include interior or second end 334 with passageway 336 extending therefrom. Each passageway 336 may transfer pressure of downhole well fluids adjacent to interior surface 312 of support arm 218 to interior end 334 of lubricant chamber 226.

Compensator assembly 338 may be disposed within lubricant chamber 226. Compensator assembly 338 may sometimes be referred to as a "reservoir," "canister," or "pressure compensator assembly." First end 340 of compensator assembly 338 may be disposed proximate external end 228 of lubricant chamber 226. Second end 342 of compensator assembly 338 may be disposed proximate interior end 334 of lubricant chamber 226.

Lubricant passageway 344 may be formed in and extend from opening 346 formed in lubricant chamber 226 through support arm 218. Lubricant passageway 344 may allow communication of lubricant between lubricant chamber 226 and ball passage 324. In some embodiments, opening 346 from lubricant passageway 344 into lubricant chamber 226 may be generally aligned with one or more openings 350 formed in exterior portions of compensator assembly 338. Conduits 348 may also be provided to communicate lubricant between ball passage 324 and bearing 308, bearing 310, seal 316, backup seal 320 and/or other suitable components.

Figure 4:
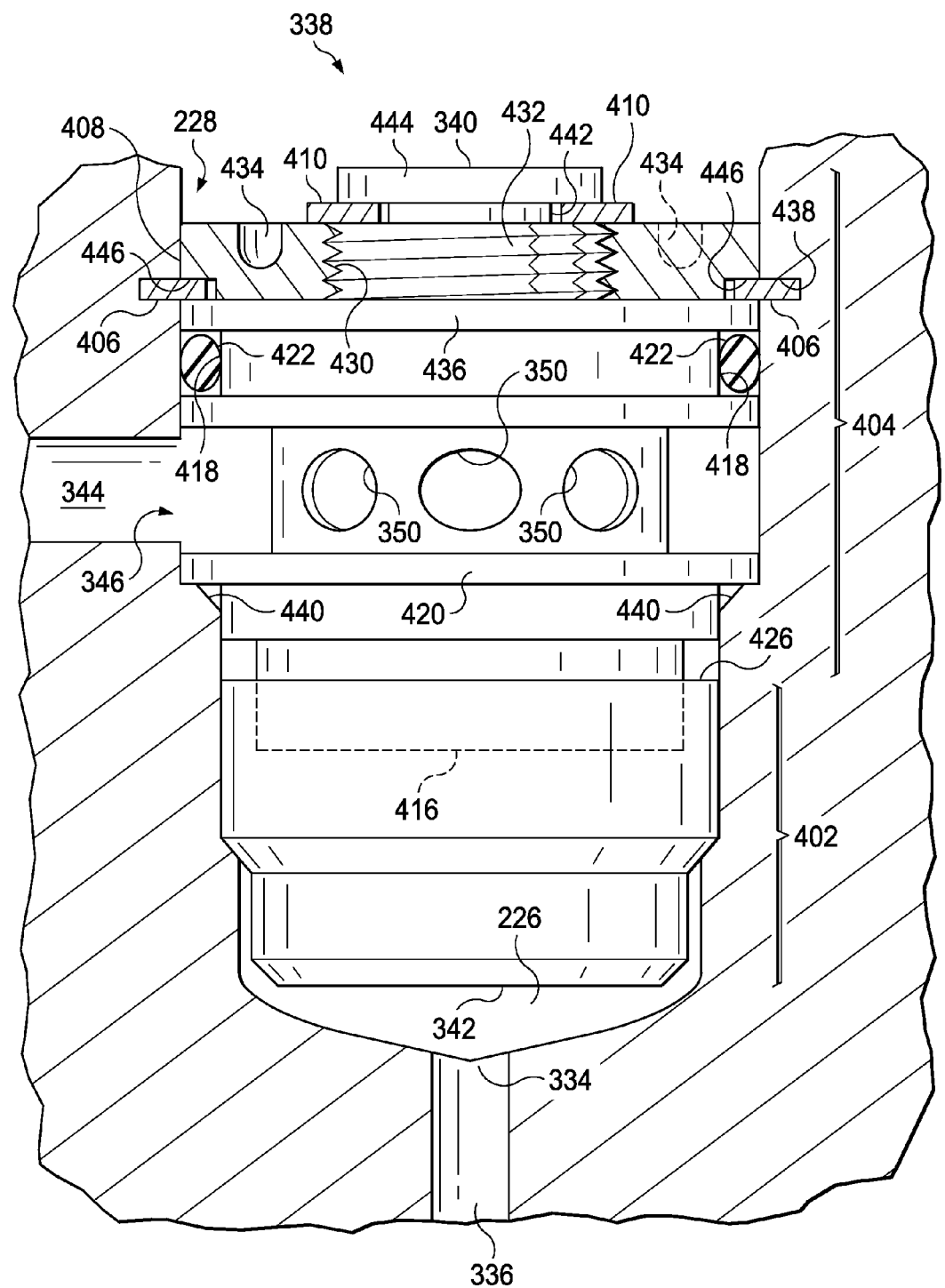
FIG. 4 illustrates an view of a compensator assembly, in accordance with some embodiments of the present disclosure.

FIG. 4 illustrates a view of compensator assembly 338, in accordance with some embodiments of the present disclosure. Compensator assembly 338 may include flexible diaphragm 402, lubricant container 404, clip ring 406, and clip ring cap 408. Lubricant container 404 may have a generally hollow, cylindrical configuration defined in part by first end 340 of compensator assembly 338 and second end 416 of compensator assembly 338 with a bore (not expressly shown) extending partially therebetween. A pressure relief mechanism (not expressly shown) may be slidably disposed within the bore of lubricant container 404 proximate first end 340. In some embodiments, the pressure relief mechanism may sometimes be described as a "pressure relief valve," and include a piston, one or more fluid seals, a biasing means, and/or any other suitable components for pressure relief. Prior to installation of compensator assembly 338 within lubrication chamber 226, the pressure relief mechanism may be installed through first end 340 of compensator assembly 338.

In some embodiments, annular recess or groove 418 may be formed in exterior portions of lubricant container 404 proximate first end 340. Various types of seals including, but not limited to, seal ring 422 may be disposed within annular recess 418 to prevent fluid communication between exterior opening 228 and interior portions of lubricant chamber 226 and contamination of lubricant disposed within lubricant container 404.

In some embodiments, annular ring or shoulder 440 may be formed on interior portions of lubricant chamber 226 between opening 346 and interior end 334. Corresponding annular collar or ring 420 may be formed on exterior portions of lubricant container 404. The location of annular ring 420 relative to annular collar or ring 436 and second end 416 of lubricant container 404 may be selected to generally align openings 350 disposed in the exterior portions of lubricant container 404 with opening 346 in lubricant passageway 344. The location of annular ring 420 relative to annular shoulder 440 may also be selected such that annular ring 436 of lubricant container 404 may be disposed beneath or spaced from clip ring recess or groove 438 formed on interior portions of lubricant chamber 226 proximate external end 228.

Flexible diaphragm or cap 402 may be attached to and extend from second end 416 of lubricant container 404. Flexible diaphragm 402 may prevent undesired contamination of lubricant disposed within lubricant container 404 and at the same time allow communication of lubricant pressure with downhole well fluid pressure proximate interior end 334 of lubricant chamber 226.

Second end 416 of lubricant container 404 may be operable to couple to annular ring 426 of flexible diaphragm 402. Flexible diaphragm 402 may be used to close second end 416 of lubricant container 404 to prevent contamination of lubricant disposed with lubricant container 404 by downhole well fluids disposed in passageway 336. The volume of lubricant contained within lubricant chamber 226 may be defined in part by the volume of the bore (not expressly shown) in lubricant container 404, accounting for any pressure relief mechanism (not expressly shown), and interior volume of flexible diaphragm 402.

Flexible diaphragm 402 may be described as having a generally cylindrical configuration with an opening formed proximate annular ring 426 sized to receive second end 416 of lubricant container 404 therein. The dimensions of annular ring 426 may be selected to be compatible with second end 416 of lubricant container 404. The dimensions and configuration of annular ring 426 may also be selected to form a generally fluid tight seal between adjacent interior portions of lubricant chamber 226 and portions of second end 416 in lubricant container 404.

In some embodiments, clip ring 406 may be described as a ring having a generally circular configuration. Clip ring 406 may be disposed or inserted in clip ring groove 438 formed within interior portions of lubricant chamber 226 proximate external end 228. Clip ring 406 may be utilized to releasably install compensator assembly 338 into lubricant chamber 226. Further, clip ring 406 may be configured to retain and/or seat compensator assembly 338 into lubricant chamber 226. Clip ring 406 may be described as a "snap ring."

Assembly head 444 may generally cylindrically shaped and may be located at first end 340 of compensator assembly 338. Securing end (or "threaded end") 432 may be located proximate assembly head 444 and between assembly head 440 and annular collar 436. Securing end 432 may be sized with approximately equivalent or slightly larger diameter than assembly head 444. Clip ring groove 442 may be a generally circular shaped recess located between assembly head 444 and securing end 432. Clip ring groove 442 may be sized to correspond to clip ring 410. As such, clip ring 410 may be disposed or installed in clip ring groove 442. During operation, clip ring 410 may substantially retain clip ring cap 408 coupled to annular collar 436 and keep clip ring cap 408 from backing off or loosening away from annular collar 436 of lubricant container 404.

Clip ring cap 408 may be described as having a generally cylindrical configuration with securing opening (or "threaded opening") 430 formed therein. Securing opening 430 may be threaded and sized to receive securing end 432 of lubricant container 404. Clip ring cap 408 may include cavities or holes 434 that may be sized to receive an attaching tool, such as a spanner wrench. Cavities 434 may extend partially or entirely through clip ring cap 408. For example, two cavities 434 may be spaced approximately one-hundred eighty degrees apart such that a spanner wrench may be blindly be inserted to tighten threads in securing opening 430 around securing end 432 of lubricant container 404. Clip ring cap 408 may include boss or shoulder 446. Shoulder 446 may be a substantially circular recess located on a side of clip ring cap 408 substantially opposite from cavities 434. Shoulder 436 may be designed to create a groove that corresponds to clip ring 406. Thus, installation of clip ring cap 408 may substantially prevent any deflection or movement of clip ring 406 during operation of drill bit 101.

During installation, clip ring cap 408 may be threaded onto securing end 432 until substantially contacting annular collar 436. Clip ring cap 408 may be installed after the installation of clip ring 406. For example, clip ring cap 408 may be installed with a spanner wrench while assembly head 444 may be held in place with another tool, e.g., an additional wrench. When clip ring cap 408 is fully seated, clip ring 410 may be installed into clip ring groove 442.

In some embodiments, utilization of clip ring cap 408 may eliminate the need for a Bellville washer or other biasing mechanism between clip ring 406 and annular collar 436. Additionally, fretting by clip ring 406 may be substantially eliminated by the use of clip ring cap 408 because clip ring cap 408 may substantially immobilizes clip ring 406. For example, use of a biasing mechanism, such as a Bellville washer, allowed movement of clip ring 406 due to vibration and pressure during drilling operations. Because clip ring cap 408 may be threadably attached to securing end 432, movement of clip ring 406 may be reduced or eliminated.

Further, installation of a biasing mechanism, such as a Bellville washer, may be difficult and in some cases, unsafe. For example, installation of a Belleville washer may require compressing the Belleville washer spring and seating a clip ring in a clip ring groove at the same time. To accomplish the assembly, a round cylinder anvil may be placed on top of the clip ring and the Belleville washer spring. The anvil may then be hit with a hammer in order to compress the Belleville washer spring to seat the clip ring in the clip ring groove. Such a process may take more than one strike with the hammer. As a consequence, the assembly process for a Belleville washer may result in injury to an operator, damage to the clip ring ring, washer, and/or entire compensator assembly. Thus, utilization of clip ring cap 408 threaded onto securing end 432 may substantially impact operator safety, substantially minimize damage to the clip ring, compensator assembly, and/or may reduce the time required for assembly and installation.

For some downhole drilling conditions, the pressure of downhole well fluids adjacent to interior surface 312 of support arm 218, shown with reference to FIG. 3, may communicate through passageway 336 and move or compress flexible diaphragm 402 to a first, generally retracted position relative to interior end 334 of lubricant chamber 226. In this retracted position, downhole well fluids may be exposed to exterior portions of flexible diaphragm 402. Compression of flexible diaphragm 402 by downhole well fluid pressure may increase the pressure of lubricant supplied from lubricant container 404 to seal 316 and/or other suitable components via passageway 334 and ball passageway 324 (shown on FIG. 3). Increasing lubricant system pressure in response to increased downhole well fluid pressure helps to protect fluid seal 316 and/or backup seal 320 by maintaining desired pressure differential across seal 316.

For some downhole drilling conditions, the pressure differential across seal 316 may be approximately zero pounds per square inch (psi). For other downhole drilling conditions, the pressure differential may be less than one hundred psi. Components of the pressure relief mechanism (not expressly shown), including any biasing mechanisms, may be selected to limit differential pressure across seal 316 to less than a maximum design value for the drill bit. For example, the pressure relief mechanism may be designed to relieve internal pressure at a differential of approximately one hundred psi or less.

For other downhole drilling conditions, the pressure of lubricant contained within lubricant container 404 and flexible diaphragm 402 may be greater than the well fluid pressure in passageway 336. During such downhole drilling conditions, flexible diaphragm 402 may expand to an enlarged position constrained by the dimensions of lubricant chamber 226. Under normal downhole drilling conditions, flexible diaphragm 402 may alternately expand and contract as needed to maintain desired pressure differential across seal 316. Contraction of flexible diaphragm 402 may cause lubricant to be relieved into lubricant chamber 226 from lubricant container 404. Expansion of flexible diaphragm 402 may cause lubricant to be extracted from lubricant chamber 226 into lubricant container 404. A pressure differential of approximately zero psi may substantially increase the downhole drilling life of seal 316 and components associated with rotation of cone assembly 206.

The pressure of lubricant within lubricant container 404 and flexible diaphragm 402 may increase in response to increased downhole temperature or other downhole drilling conditions. Lubricant pressure within lubricant container 404 and flexible diaphragm 402 may also increase in response to increased temperature associated with forming a wellbore in relatively hard or difficult drilling conditions which produces increased friction and heating during rotation of cone assembly 206 relative to journal 302.

Thus, downhole well fluid pressure surrounding exterior portions of drill bit 101 may be transmitted to lubricant disposed in lubricant container 404 by flexing of flexible diaphragm 402. Such flexing of diaphragm 402 may maintain lubricant pressure generally equal to the pressure of the downhole well fluid pressure adjacent to drill bit 101. This pressure may be transmitted through opening 346, lubricant passage 344, ball passage 324, and conduit 348 to the an inner face of seal 316. As a result, seal 316 may be exposed to an internal pressure from the lubricant generally equal to the pressure of the external fluids. Maintaining very small or approximately zero differential pressure across fluid seal 316 may prevent damage to fluid seal 316 and substantially increase downhole drilling life of drill bit 101.

Although the present disclosure and its advantages have been described in detail, it should be understood that various changes, substitutions and alterations can be made herein without departing from the spirit and scope of the disclosure as defined by the following claims.

What is claimed is:

1. A roller cone drill bit comprising:
a bit body including a support arm extending therefrom;
a cone assembly mounted on a journal extending from the support arm;
a lubricant chamber in the support arm; and
a compensator assembly in the lubricant chamber, the compensator assembly comprising:
a lubricant container including a securing end;
a clip ring coupled to the lubricant container and configured to retain the lubricant container in the lubricant chamber;
a ring cap including a securing hole configured to couple to the securing end of the lubricant container, the ring cap including a shoulder configured to retain the clip ring;
an assembly head coupled to the securing end;
a ring groove located between the assembly head and the securing end; and
a second clip ring located in the ring groove and coupled to the compensator assembly, the second clip ring configured to retain the ring cap in the lubricant chamber.

2. The drill bit of claim 1, wherein:
the lubricant chamber includes a clip ring groove; and
the clip ring is located in the clip ring groove.

3. The drill bit of claim 1, wherein the securing end comprises a plurality of threads and the securing hole comprises a plurality of threads that couple to the plurality of threads on the securing end.

4. The drill bit of claim 1, wherein the ring cap includes two cavities extending partially through the ring cap and located approximately 180 degrees apart.

5. The drill bit of claim 1, wherein the ring cap is configured to substantially immobilize the clip ring.

6. The drill bit of claim 1, wherein the ring cap is configured to retain the clip ring to substantially eliminate fretting of the clip ring.

7. The drill bit of claim 1, wherein the ring cap has a generally cylindrical configuration.

8. A compensator assembly comprising:
a lubricant container including a securing end;
a clip ring coupled to the lubricant container and configured to retain the lubricant container in a lubricant chamber;
a ring cap including a securing hole configured to couple to the securing end of the lubricant container, the ring cap including a shoulder configured to retain the clip ring;
an assembly head coupled to the securing end;
a ring groove located between the assembly head and the securing end; and
a second clip ring located in the ring groove and coupled to the compensator assembly, the second clip ring configured to retain the ring cap in the lubricant chamber.

9. The compensator assembly of claim 8, wherein the clip ring is configured to be located in a clip ring groove of the lubricant chamber.

10. The compensator assembly of claim 8, wherein the securing end comprises a plurality of threads and the securing hole comprises a plurality of threads that couple to the plurality of threads on the securing end.

11. The compensator assembly of claim 8, wherein the ring cap includes two cavities extending partially through the ring cap and located approximately 180 degrees apart.

12. The compensator assembly of claim 8, wherein the ring cap is configured to substantially immobilize the clip ring.

13. The compensator assembly of claim 8, wherein the ring cap is configured to retain the clip ring to substantially eliminate fretting of the clip ring.

14. The compensator assembly of claim 8, wherein the ring cap has a generally cylindrical configuration.

15. A method for lubricant pressure compensation in a roller cone drill bit comprising:
determining a pressure in a lubricant container of a compensator assembly located in a lubricant chamber;
relieving a lubricant into the lubricant chamber from the lubricant container when the pressure in the lubricant container exceeds a pressure in the lubricant chamber, the lubricant container including a securing end;

retaining the lubricant container in the lubricant chamber with a clip ring coupled to the lubricant container, and a ring cap including a securing hole configured to couple to the securing end of the lubricant container, the ring cap including a shoulder configured to retain the clip ring; and retaining the ring cap in the lubricant chamber with a second clip ring located in a ring groove between an assembly head and the securing end.

16. The method of claim 15, wherein the securing end comprises a plurality of threads and the securing hole comprises a plurality of threads that couple to the plurality of threads on the securing end.

17. The method of claim 15, where the ring cap includes two cavities extending partially through the ring cap and located approximately 180 degrees apart.

18. The method of claim 15, further comprising substantially immobilizing the clip ring with the ring cap.

19. The method of claim 15, further comprising retaining the clip ring with the ring cap to substantially eliminate fretting of the clip ring.

20. The method of claim 15, further comprising blindly tightening the securing hole around the securing end of the lubricant chamber.

* * * * *